(12) United States Patent  
Mitomo et al.

(10) Patent No.: US 8,266,250 B2  
(45) Date of Patent: Sep. 11, 2012

(54) COMMUNICATION DETECTION DEVICE, METHOD, AND PROGRAM FOR PEER-TO-PEER COMMUNICATION

(75) Inventors: Masashi Mitomo, Kawasaki (JP); Masahiro Komura, Kawasaki (JP); Satoru Torii, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 717 days.

(21) Appl. No.: 12/412,309

(22) Filed: Mar. 26, 2009

(65) Prior Publication Data

US 2009/0249131 A1 Oct. 1, 2009

(30) Foreign Application Priority Data

Mar. 28, 2008 (JP) ................... 2008-085353

(51) Int. Cl.  
*G06F 13/00* (2006.01)
(52) U.S. Cl. ........................................ 709/219
(58) Field of Classification Search .................. 709/219  
See application file for complete search history.

(56) References Cited

U.S. PATENT DOCUMENTS

| 7,159,149 B2 | 1/2007 | Spiegel et al. | |
|---|---|---|---|
| 2002/0062375 A1* | 5/2002 | Teodosiu et al. | 709/226 |
| 2005/0147044 A1* | 7/2005 | Teodosiu et al. | 370/236 |
| 2008/0123545 A1* | 5/2008 | Watanabe et al. | 370/252 |

* cited by examiner

*Primary Examiner* — Robert B Harrell  
(74) *Attorney, Agent, or Firm* — Fujitsu Patent Center

(57) ABSTRACT

A communication detection method in which, based on a sender and a destination of communication data recorded in a communication log that records information concerning communication data exchanged between devices linked to a network, the communication log is divided into parts corresponding to individual object devices. The communication logs divided corresponding to the individual devices are analyzed so that the communication data in which a connection request to each device has been issued is extracted, and then a response success/failure table is generated based on whether a response from the device to the connection request has been detected; and based on the response success/failure table, when a time period that no response is obtained from the device satisfies a criterion condition determined in advance, it is determined that peer-to-peer communication has been performed.

10 Claims, 15 Drawing Sheets

FIG. 2
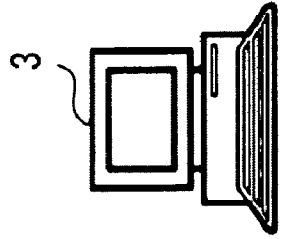
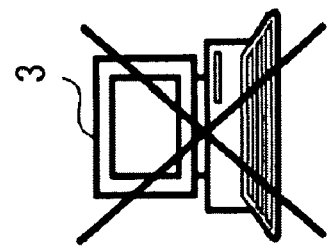
4a
4b
4c
4d
NO RESPONSE
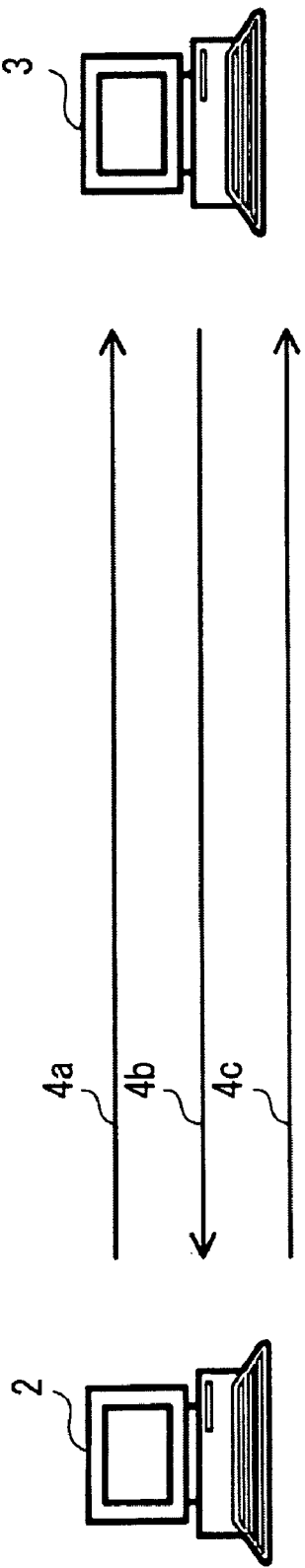
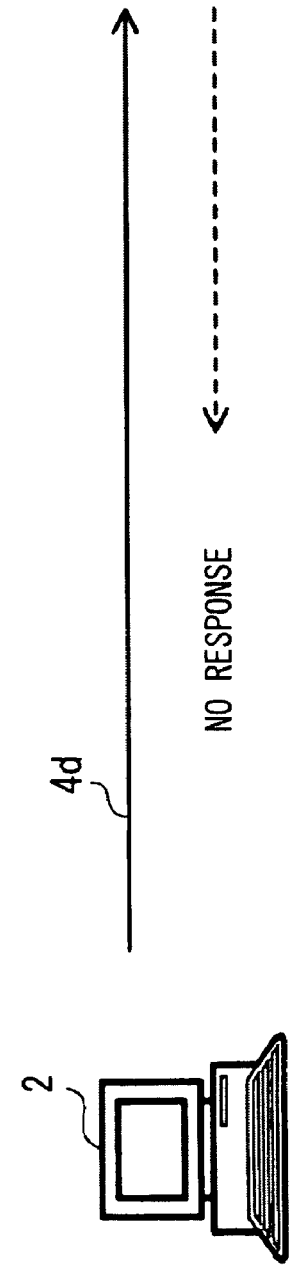
[A] HOST IS IN POWER-ON STATE
[B] HOST IS IN POWER-OFF STATE

FIG. 6

| No. | TIME | SENDER IP | DESTINATION IP | PROTOCOL | INFORMATION |
|---|---|---|---|---|---|
| 1 | 2007-12-21 18:57:02.307646 | 1.2.3.4 | 100.1.2.3 | TCP | 2520 > http [SYN] Seq=0 Len=0 MSS=1460 |
| 2 | 2007-12-21 18:57:02.307985 | 100.1.2.3 | 1.2.3.4 | TCP | http > 2520 [SYN,ACK] Seq=0 Ack=1 Win=5840 Len=0 ... |
| 3 | 2007-12-21 18:57:02.308009 | 1.2.3.4 | 100.1.2.3 | TCP | 2520 > http [ACK] Seq=1 Ack=1 Win=65535 Len=0 |
| 4 | 2007-12-21 18:57:02.308093 | 1.2.3.4 | 100.1.2.3 | HTTP | GET / HTTP/1.1 |
| 5 | 2007-12-21 18:57:02.308467 | 100.1.2.3 | 1.2.3.4 | TCP | http > 2520 [ACK] Seq=1 Ack=524 Win=6432 Len=0 |
| 6 | 2007-12-21 18:57:02.309446 | 100.1.2.3 | 1.2.3.4 | HTTP | HTTP/1.1 200 OK(text/html) |
| 7 | 2007-12-21 18:57:02.309464 | 100.1.2.3 | 1.2.3.4 | TCP | http > 2520 [FIN,ACK] Seq=1042 Ack=524 Win=6432 ... |
| 8 | 2007-12-21 18:57:02.309487 | 1.2.3.4 | 100.1.2.3 | TCP | 2520 > http [ACK] Seq=524 Ack=1043 Win=64494 ... |
| 9 | 2007-12-21 18:57:02.310239 | 1.2.3.4 | 100.1.2.3 | TCP | 2520 > http [FIN,ACK] Seq=524 Ack=1043 Win=64494 ... |
| 10 | 2007-12-21 18:57:02.310414 | 100.1.2.3 | 1.2.3.4 | TCP | http > 2520 [ACK] Seq=1034 Ack=525 Win=6432 ... |
| ... | | | | | |
| 21 | 2007-12-21 18:57:03.310000 | 1.2.3.6 | 100.1.2.3 | TCP | 5555 > http [SYN] Seq=0 Len=0 MSS=1460 |
| ... | | | | | |

(1) DIVIDED WITH RESPECT TO 100.1.2.3  ~1120a

| No. | SENDER IP | DESTINATION IP |
|---|---|---|
| 1 | 1.2.3.4 | 100.1.2.3 |
| 3 | 100.1.2.3 | 1.2.3.4 |
| 4 | 1.2.3.6 | 100.1.2.3 |
| 9 | 100.1.2.3 | 1.2.3.6 |

(2) DIVIDED WITH RESPECT TO 110.10.20.30  ~1120b

| No. | SENDER IP | DESTINATION IP |
|---|---|---|
| 2 | 1.2.3.5 | 110.10.20.30 |
| 5 | 110.10.20.30 | 1.2.3.5 |
| 8 | 1.2.3.5 | 110.10.20.30 |
| 10 | 110.10.20.30 | 1.2.3.5 |

(3) DIVIDED WITH RESPECT TO 120.100.10.1  ~1120c

| No. | SENDER IP | DESTINATION IP |
|---|---|---|
| 6 | 1.2.3.7 | 120.100.10.1 |
| 7 | 120.100.10.1 | 1.2.3.7 |

~1110a

| No. | SENDER IP | DESTINATION IP |
|---|---|---|
| 1 | 1.2.3.4 | 100.1.2.3 |
| 2 | 1.2.3.5 | 110.10.20.30 |
| 3 | 100.1.2.3 | 1.2.3.4 |
| 4 | 1.2.3.6 | 100.1.2.3 |
| 5 | 110.10.20.30 | 1.2.3.5 |
| 6 | 1.2.3.7 | 120.100.10.1 |
| 7 | 120.100.10.1 | 1.2.3.7 |
| 8 | 1.2.3.5 | 110.10.20.30 |
| 9 | 100.1.2.3 | 1.2.3.6 |
| 10 | 110.10.20.30 | 1.2.3.5 |

FIG. 8

| No. | TIME | SENDER IP | DESTINATION IP | SENDER PORT | DESTINATION PORT | SUCCESS/ FAILURE |
|---|---|---|---|---|---|---|
| 1 | 2007-12-21 18:57:02.307646 | 1.2.3.4 | 100.1.2.3 | 2520 | http | SUCCESS |
| 2 | 2007-12-21 18:57:03.310000 | 1.2.3.6 | 100.1.2.3 | 5555 | http | FAILURE |
| 3 | 2007-12-21 19:04:02.308000 | 1.2.3.4 | 100.1.2.3 | smtp | 1234 | SUCCESS |
| ⋮ | | | | | | ⋮ |
| 100 | 2007-12-22 07:30:01.408500 | 1.2.3.4 | 100.1.2.3 | 2520 | http | SUCCESS |
| 101 | 2007-12-22 07:31:01.324100 | 1.2.3.4 | 100.1.2.3 | 2520 | http | FAILURE |
| 102 | 2007-12-22 07:31:08.156210 | 1.2.3.6 | 100.1.2.3 | 5555 | http | FAILURE |
| 103 | 2007-12-22 07:34:03.178930 | 1.2.3.7 | 100.1.2.3 | 2530 | http | FAILURE |
| ⋮ | | | | | | ⋮ |
| 265 | 2007-12-22 15:35:02.323746 | 1.2.3.4 | 100.1.2.3 | 2520 | http | FAILURE |
| ⋮ | | | | | | ⋮ |
| 311 | 2007-12-22 18:54:12.365446 | 1.2.3.8 | 100.1.2.3 | 2540 | http | FAILURE |
| 312 | 2007-12-22 18:55:02.307546 | 1.2.3.4 | 100.1.2.3 | 2520 | http | SUCCESS |
| 313 | 2007-12-22 18:57:04.354000 | 1.2.3.6 | 100.1.2.3 | 5555 | http | SUCCESS |
| 314 | 2007-12-22 19:03:02.332100 | 1.2.3.4 | 100.1.2.3 | smtp | 1234 | SUCCESS |
| ⋮ | | | | | | ⋮ |

COMMUNICATION DETECTION DEVICE, METHOD, AND PROGRAM FOR PEER-TO-PEER COMMUNICATION

CROSS-REFERENCE TO RELATED APPLICATION(S)

This application is based upon and claims the benefit of priority of the prior Japanese Patent Application No. 2008-85353, filed on Mar. 28, 2008, the entire contents of which are incorporated herein by reference.

FIELD

The present invention relates to a communication detection device, a communication detection method, and a communication detection program for detecting communication exchanged between devices linked to a network.

BACKGROUND

In a peer-to-peer communication mode in a computer network, fixed clients and servers are not present, and data is directly exchanged between hosts. In contrast to client-server communication in which loads tend to be concentrated on the server, the peer-to-peer communication method has an advantage that loads can easily be distributed. Thus, this method is widely used for exchanging and circulating files through a network. The peer-to-peer communication itself is an excellent technique. Nevertheless, this method is employed in so-called file-swapping software, and hence is considered to be a hotbed for unauthorized contents distribution including copyright infringement. Further, problems, such as spreading of virus infection through peer-to-peer communication and leakage of confidential information or personal information caused by viruses that expose information, arise frequently. Thus, countermeasures against these problems are desired urgently.

In the prior art, several mechanisms are available for monitoring and controlling peer-to-peer communication on a network. These mechanisms perform detection on the basis of patterns (signatures) specific to known peer-to-peer communication. Nevertheless, these patterns need to be generated one by one on the basis of analysis performed by experts who have the required skills. Thus, in practice, peer-to-peer communication software whose new types appear every day cannot be addressed sufficiently.

Furthermore, in general, also in detection of computer viruses, detection methods are employed that are based on patterns that define features of files infected with viruses. Nevertheless, new viruses appear every day, and pattern generation is repeated endlessly. Thus, as a detection method not based on patterns, for example, U.S. Pat. No. 7,159,149 discloses a worm detection method that detects when connection failures of a host exceed a threshold value and then determine whether or not the detected host is infected with a worm.

In view of the present situation that generation of new patterns used for detection of peer-to-peer communication cannot keep up with the appearance of new software, a technique is desired for detecting peer-to-peer communication not based on patterns. Nevertheless, it is not easy to detect peer-to-peer communication without relying on patterns.

SUMMARY

Accordingly, it is an object of the embodiment to provide a communication detection device, a communication detection method, and a communication detection program in which, based on a sender and a destination of communication data recorded in a communication log that records information concerning communication data exchanged between devices linked to a network, the communication log is divided into parts corresponding to individual object devices. The communication logs divided corresponding to the individual devices are analyzed so that the communication data in which a connection request to each device has been issued is extracted, and then a response success/failure table is generated based on whether a response from the device to the connection request has been detected; and based on the response success/failure table, when a time period in which no response is obtained from the device satisfies a criterion condition determined in advance, it is determined that peer-to-peer communication has been performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating communication behavior depending on a state of a host.
FIG. 6 is a diagram illustrating an example of a communication log.
FIG. 8 is a diagram illustrating an example of a response success/failure table.

DETAILED DESCRIPTION OF THE PREFERRED EMBODIMENTS

Figure 1:
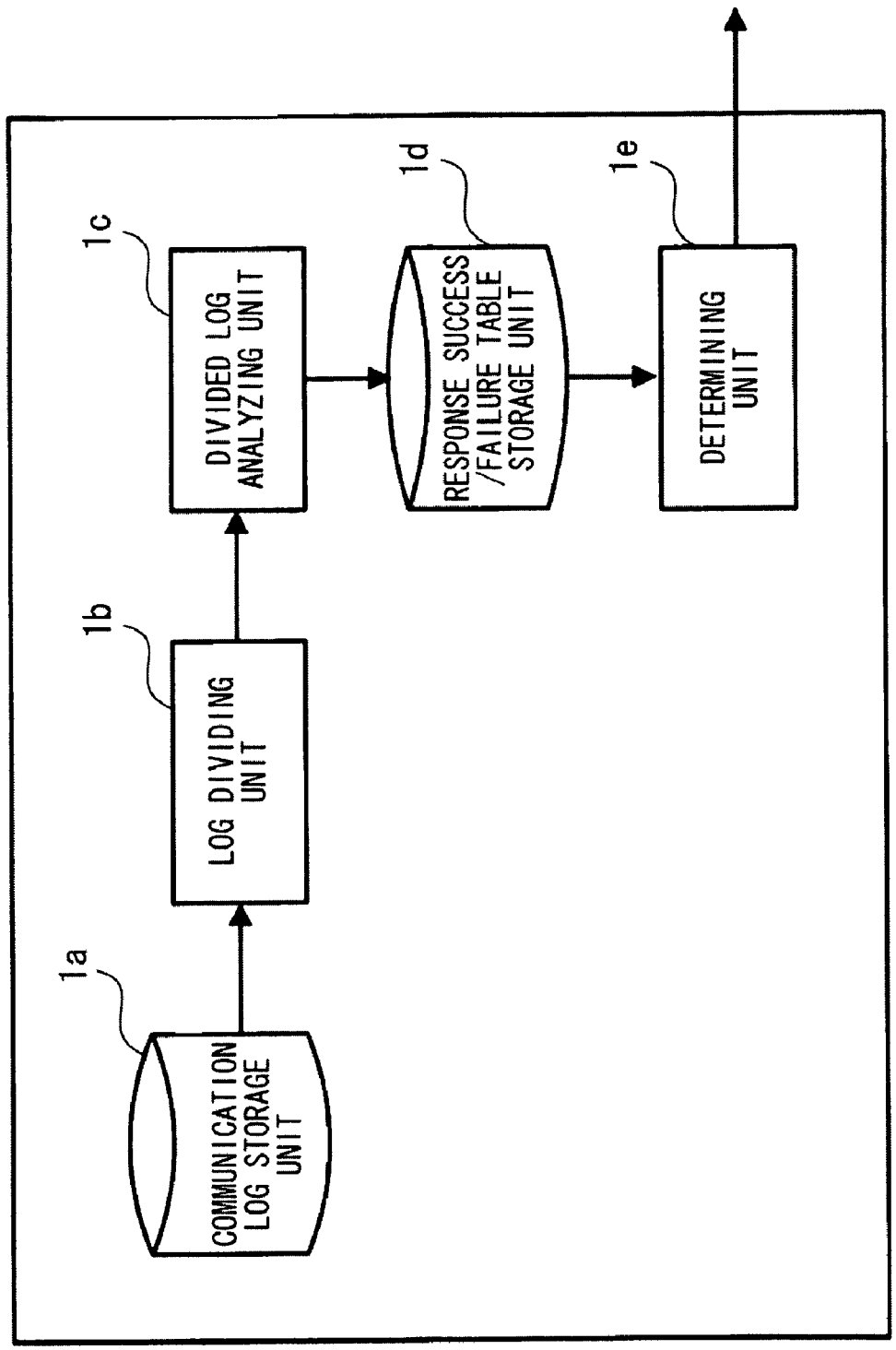
FIG. 1 is a conceptual diagram illustrating an embodiment.

Embodiments are described below with reference to the drawings. FIG. 1 is a conceptual diagram illustrating an embodiment.

A communication detection device 1 includes a communication log storage unit 1a for storing a communication log that records exchange of communication data; a log dividing unit 1b for dividing the communication log into parts corresponding to individual devices; a divided log analyzing unit 1c for analyzing the divided communication log and generating a response success/failure table for each device; a response success/failure table storage unit ad for storing the response success/failure table; and a determining unit 1e for determining whether peer-to-peer communication has been performed. Here, the functions of these units may be realized by a computer that executes a communication detection program.

The communication log storage unit 1a stores a communication log that records information concerning communication data exchanged between devices linked to a network. The communication log includes information such as the communication address of a sender of communication data (referred to as a "sender address" hereinafter), the communication address of a destination (referred to as a "destination address" hereinafter), the detection time of the communication data, and the type of the communication data.

The log dividing unit 1b reads from the communication log storage unit 1a a communication log of a specific time period. Then, on the basis of the sender address and the destination address of the communication data recorded in the read communication log, the log dividing unit 1b divides the communication log into parts corresponding to individual object devices. For example, by adopting external devices linked to an external network as object devices, or alternatively by adopting internal devices linked to an internal network as object devices, the communication log may be divided into parts corresponding to individual devices. The internal network, or intranet, may be an intra-company network or the like. Thus, in general, the communication address of each internal device linked to the intra-company network may be known or partly known. In contrast, the communication address of each external device linked to the external network is unknown. For example, if a sender address is the same as a communication address of an internal device while the destination is unknown, the communication data is recognized as that sent from an internal device to an external device. As such, a communication log in which the communication address of an internal device is recorded as the sender or the destination is adopted as a divided log corresponding to the internal device. Similarly, the communication log may also be divided with respect to another internal device, so that the communication log may be divided into parts corresponding to individual internal devices. If the object device is an external device, a similar procedure is adopted so that the communication log can be divided into parts corresponding to the communication addresses of individual external devices (having unknown communication addresses).

The divided log analyzing unit 1c analyzes the communication logs divided corresponding to individual devices. The divided log analyzing unit 1c extracts communication data in which a connection request to a device has been issued, and then detects the presence or absence of a response from the device to this connection request so as to generate a response success/failure table. The response success/failure table includes a sender address of a connection request, a destination address, a transmission time, and a response success or failure. In the response success or failure, "success" is set when a response to the connection request is detected, while "failure" is set when no response to the connection request is detected. The response success/failure table is stored in the response success/failure table storage unit 1d.

The response success/failure table storage unit 1d stores the response success/failure table generated for each object device.

The determining unit 1e reads the response success/failure table for each device stored in the response success/failure table storage unit 1d, and then recognizes the time period in which no response is obtained from the device, that is, that the response success or failure is considered a "failure". The recognized time period is compared to a criterion condition determined in advance. Then, when the criterion condition is satisfied, the determining unit 1e may determine that peer-to-peer communication has been performed. The criterion condition is a condition where the presumption of execution of peer-to-peer communication is set up based on features in communication behavior of peer-to-peer communication. For example, a set-up condition may be "no response is obtained for a continuous time period exceeding a specified time period" or "no response is obtained for a continuous time period exceeding a specific time period in a specified time zone".

Before the description of the operation of the communication detection device 1 having this configuration, first the outline of the present embodiment is described below.

In general, the substantial part of peer-to-peer communication is communication based on a protocol such as HTTP (HyperText Transfer Protocol). This is because communication not based on a permitted protocol such as HTTP is filtered by a firewall or the like on the network and hence does not reach the destination. Here, the HTTP is a protocol that is used by an ordinary web browser in accessing a website. That is, at protocol levels, peer-to-peer communication cannot be distinguished from ordinary access to a website. Thus, when communication is simply monitored on the network, peer-to-peer communication is difficult to detect among a large amount of traffic accessing websites.

Furthermore, a large amount of transmissions generated in a short time so as to cause a large number of connection errors like in the case of a worm can be detected when the number of connection errors exceeds a threshold value. Nevertheless, peer-to-peer communication is an information exchange between hosts, and hence the operation progresses smoothly. Thus, peer-to-peer communication is difficult to detect with a similar technique.

In the present embodiment, for the purpose of detecting peer-to-peer communication, the log dividing unit divides a communication log stored in the communication log storage unit into parts corresponding to individual object devices. The divided log analyzing unit analyzes the communication logs divided corresponding to individual object devices, and then generates a response success/failure table in accordance with the presence or absence of a response to the connection request issued to each object device. Then, based on the response success/failure table, when the time period in which no response is obtained from the device satisfies a criterion condition, the determining unit determines that peer-to-peer communication has been performed.

In the above-mentioned configuration, peer-to-peer communication is detected based on the success or failure of a response to a connection request, which is recorded in a communication log, issued to an object device. This permits detection of peer-to-peer communication without using information such as a pattern that depends on individual software.

Next, features of peer-to-peer communication, that is, features of peer-to-peer communication behavior are described. Here, communication behavior is recognized based on an exchange of communication data recorded in the communication log. FIG. 2 is a diagram illustrating communication behavior depending on a state of a host. Part [A] illustrates data exchange when the host is in a power-ON state. Part [B] illustrates data exchange when the host is in a power-OFF state. Here, in the example illustrated in the figure, data exchange is performed when a three-way handshake is performed for the purpose of establishing connection by TCP (Transmission Control Protocol). This data exchange is recorded in the communication log.

Part [A] is a diagram illustrating an example of communication data recorded in the communication log at the time of and after a connection request when the host is in a power-ON state. In the three-way handshake procedure of TCP (referred to as TCP handshake, hereinafter), first, a side desiring connection (client 2) transmits a SYN packet (4a) that indicates a connection request to a side to be connected (host 3). The host 3 transmits, to the client 2, a SYN ACK (referred to as a SYN/ACK, hereinafter) packet (4b) that is a combination of an ACK that indicates connection permission and a SYN packet of a packet connection request. Finally, the client 2 transmits an ACK packet (4c) so that connection is established. When the host 3 is powered ON, a series of TCP handshakes is performed and the exchanged packets are recorded in the communication log.

Part [B] is a diagram illustrating an example of communication data recorded in the communication log at the time of and after a connection request when the host is in a power-OFF state. Similarly to part [A], first, the client 2 transmits a SYN packet (4d) to the host 3. Nevertheless, the host 3 is in a power-OFF state and hence cannot send back a response. Since no SYN/ACK packet is obtained, the client 2 abandons establishing a connection. As such, when the host 3 is in a power-OFF state, a SYN packet is recorded in the communication log, but no SYN/ACK packet is recorded after that.

Thus, when the host 3 is in a power-ON state, a SYN/ACK packet is returned as a response to a SYN packet transmitted from the client 2 to the host 3. In contrast, when the host 3 is in a power-OFF state, no response is returned. As described here, communication behavior is different depending on whether or not the host 3 of the connection destination is in an operating state.

Here, the host 3 is assumed to be a web server for providing a service by using an HTTP protocol. For example, such a server provides various kinds of services like Internet shopping, Internet banking, and providing of various kinds of information. In general, such a server aims at providing services widely to users on the Internet. Thus, at a remarkably high probability, such a web server, in other words, a host serving as a web server, is almost always in an operating state except for occasions of temporary maintenance. In contrast, software employing the peer-to-peer technique is almost always of private use. That is, peer-to-peer software that is employed in file-swapping software and that is the target of detection is, in general, installed in a private personal computer or the like. Such a private personal computer need not always be in an operating state like a web server. Thus, it is likely that the computer is in a power-ON state only when the owner uses it. Thus, a difference may be recognized between a situation that when the connection request destination is an ordinary website, the computer is almost always in an operating state, and between a situation that when the connection request destination is a computer performing peer-to-peer communication, the computer is not always in an operating state.

As seen from the consideration given above, the following properties are empirically expected concerning the communication behavior.

A host 3 that always sends back a SYN/ACK to a SYN packet is usually an ordinary web server.

(2) A host 3 that does not send back a SYN/ACK to a SYN packet in some cases may be a private personal computer in which peer-to-peer software is installed.

The communication detection device 1 analyzes the communication log and detects a connection request. Then, when a response to the connection request is detected, case (1) is concluded. When the situation that no response is detected agrees with a criterion condition, for example that no response is detected for a specific time period, case (2) is concluded, that is, that peer-to-peer communication has been performed may be determined.

Here, Collins and his colleagues have reported a result of survey of peer-to-peer communication on the internet (Michael R Collins and Michael K. Reiter, "Finding Peer-to-Peer File-Sharing Using Coarse Network Behaviors", "Computer Security ? ESORICS2006, Springer Berlin/Heidelberg, Sep. 21, 2006, pp. 1-17). According to this report, "failed connections" occurred at a rate of 1% in ordinary HTTP communication, while "failed connections" occurred at a rate as high as 68% in communication using BitTorrent which is popular software employing peer-to-peer communication.

Returning to FIG. 1, the communication detection device 1 detects peer-to-peer communication based on the above communication features. The log dividing unit 1b reads the communication log of a specific time period stored in the communication log storage unit 1a, and then divides the communication log into parts corresponding to individual object devices. When external devices are to be adopted as object devices, the communication log is divided corresponding to individual communication addresses of the external devices. When internal devices are to be adopted as object devices, the communication log is divided corresponding to individual communication addresses of the internal devices. The divided log analyzing unit 1c analyzes the communication logs divided corresponding to individual devices, extracts communication data in which a connection request to each device has been issued, and then searches for response communication data. Then, a response success/failure table is generated in which, together with related information such as the sender and the destination, "success" is registered when a response has been detected, or alternatively "failure" is registered when a response has not been detected. The response success/failure table is stored in the response success/failure table storage unit 1d. The determining unit 1e refers to the response success/failure table so as to compare the data to a criterion condition, and determines whether or not peer-to-peer communication has been performed by the object device.

When the above-mentioned processing is executed, devices that have performed peer-to-peer communication may be recognized.

As such, when a personal computer is in a power-ON state, the distinction between a private personal computer in which software for performing peer-to-peer communication is installed and a server, such as a web server, is difficult to achieve on the basis of behavior on the network. However, in general, a private personal computer is not always in an operating state, while a server is almost always in an operating state. Thus, when a host from which no response is obtained is identified, a personal computer in which peer-to-peer software is installed may be identified. Further, the possibility that no response is obtained from an ordinary server is remarkably low. Thus, the possibility that an ordinary server is misrecognized as a personal computer in which peer-topeer software is installed is low. That is, peer-to-peer communication can be detected with accuracy.

Next, embodiments are described below in detail with reference to the drawings for cases where the present invention is applicable to a log analysis server arranged in an intranet such as an intra-company network. Here, examples are described in which peer-to-peer (referred to as P2P, hereinafter) communication is detected by detecting an HTTP request. Further, different communication logs are acquired in response to the same operation in accordance with a difference in the network position where the server for acquiring the communication log is located. Thus, a first embodiment is described for when the communication log is acquired on the outer side of a proxy server. Then, a second embodiment is described for when the communication log is acquired on the inner side of a proxy server.

Figure 3:
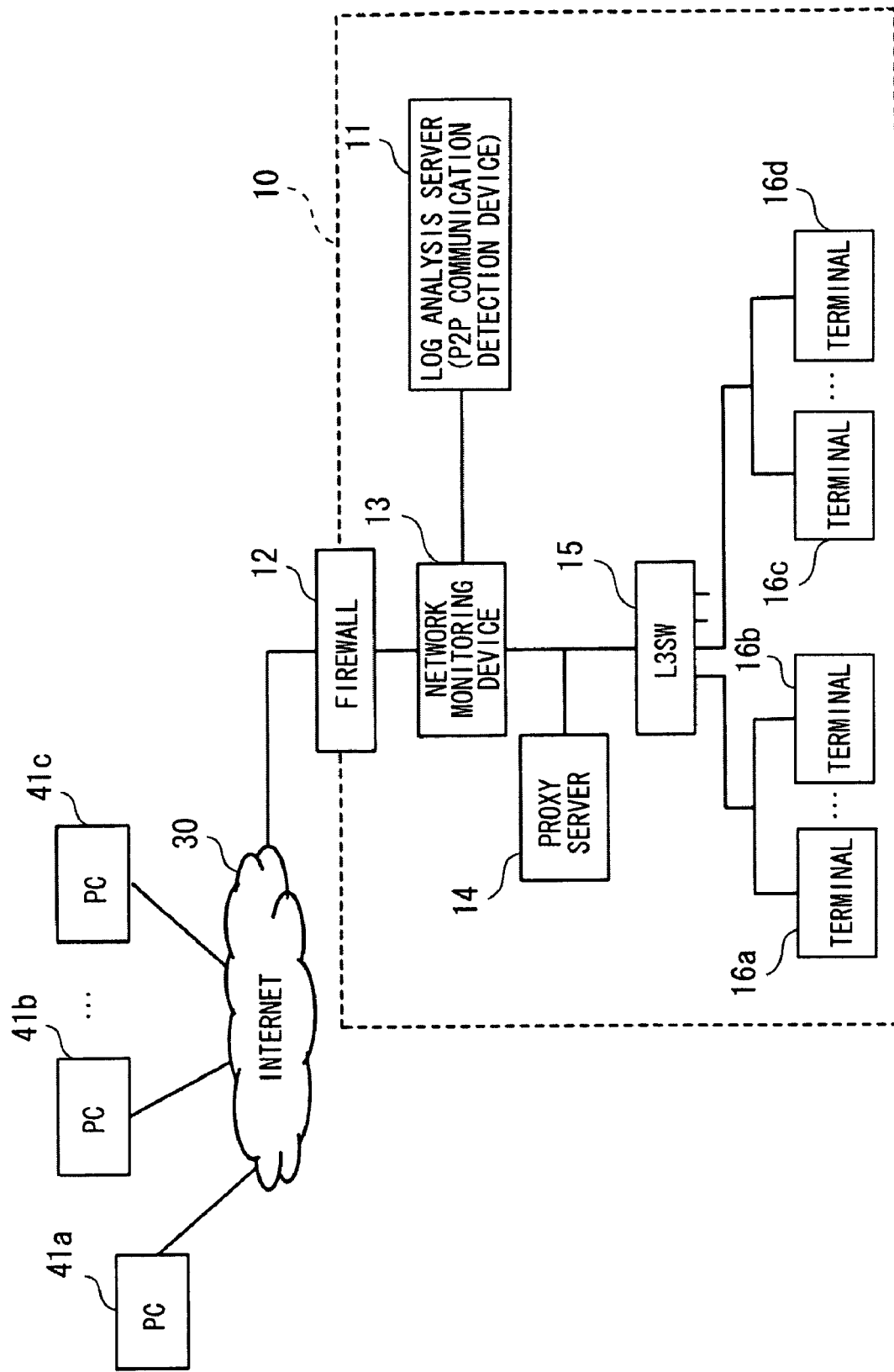
FIG. 3 is a diagram illustrating an example of a system configuration according to a first embodiment.

The first embodiment is described below for a case where a network monitoring device for providing a communication log to a log analysis server is arranged on the outer side of a proxy server (on the side near an external network of a proxy server). FIG. 3 is a diagram illustrating an example of a system configuration according to the first embodiment.

An intranet 10 is linked to the external internet 30 via a firewall 12. The intranet 10 is linked to a log analysis server (P2P communication detection device) 11, a network monitoring device 13, a proxy server 14, a layer-3 switch (L3SW) 15, and terminals 16a, 16b, 16c, and 16d. Further, the internet 30 serving as an external network is linked to personal computers (referred to as PCs, hereinafter) 41a, 41b, and 41c that exchange data with the terminals 16a, 16b, 16c, and 16d on the intranet 10 when desired.

The firewall 12 monitors communication data that flows through the boundary between the internet 30 and the intranet 10, and performs packet filtering. The network monitoring device 13 monitors communication performed via the internet 30, and captures all communication data passing therethrough. On the basis of the captured communication data, a communication log is generated and then accumulated in a specific storage device. The proxy server 14 manages accesses that enter or exit the intranet 10, in a unified manner. For example, the proxy server 14 may be a relay server that relays HTTP connections. The L3SW 15 determines the destination of a packet on the basis of data in the layer 3 (network layer), and then transfers the packet. The L3SW 15 transfers packets to be transmitted to or received from the terminals 16a, 16b, 16c, and 16d. The log analysis server 11 functions as the communication detection device 1 and acquires a communication log from the network monitoring device 13 so as to detect P2P communication. The log analysis server 11 may not be provided separately, and the function of the communication detection device 1 may be incorporated into the network monitoring device 13. Furthermore, when the proxy server 14 is not provided, the situation becomes similar to the first embodiment in which the network monitoring device 13 is arranged on the outer side of the proxy server 14.

Figure 4:
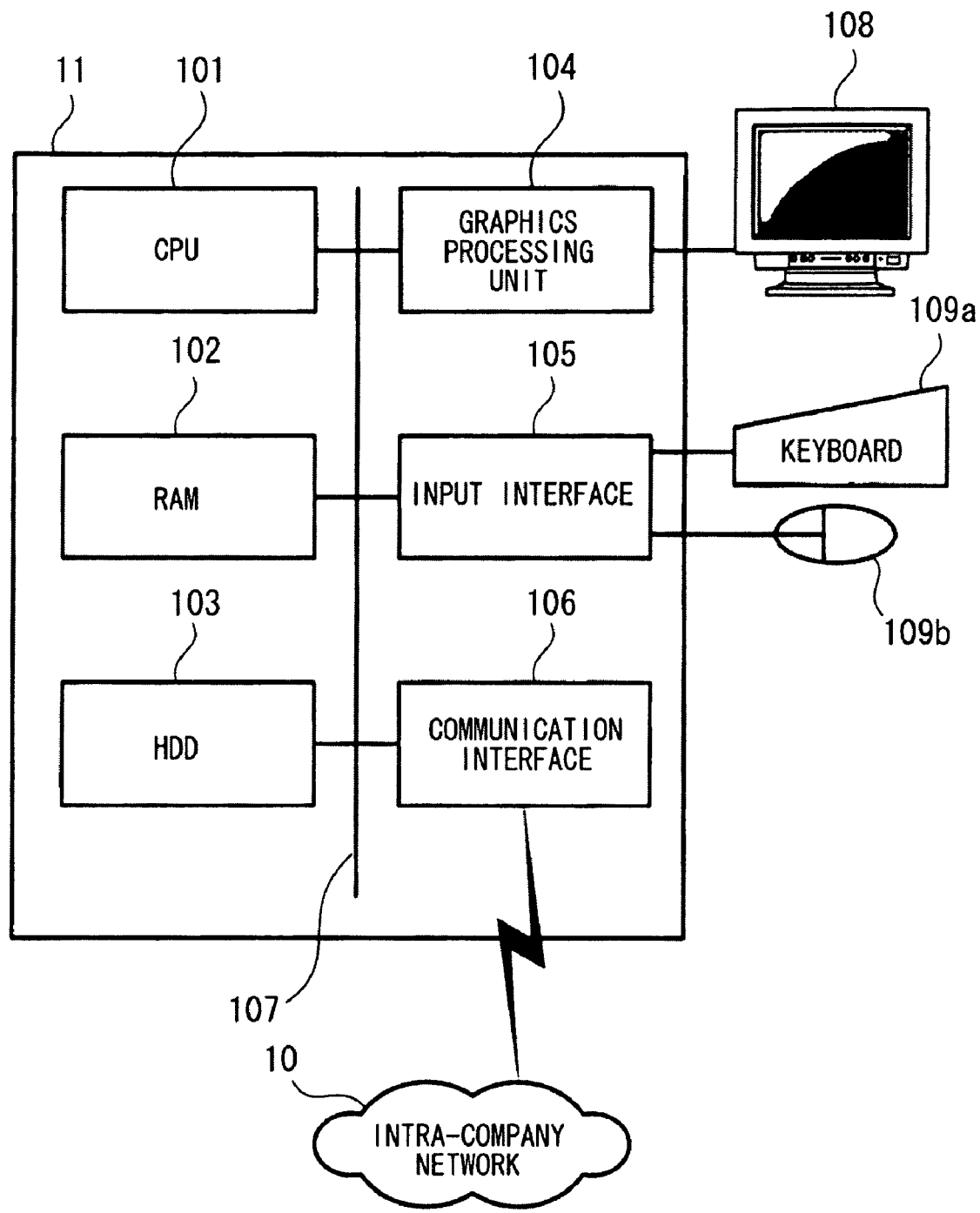
FIG. 4 is a block diagram illustrating an example of a hardware configuration of a log analysis server.

Here, the hardware configuration of the log analysis server is described below. FIG. 4 is a block diagram illustrating an example of a hardware configuration of a P2P communication detection device.

In the log analysis server 11, the device is controlled by a CPU (Central Processing Unit) 101. The CPU 101 is connected through a bus 107 to a RAM (Random Access Memory) 102, a hard disk drive (HDD) 103, a graphics processing unit 104, an input interface 105, and a communication interface 106.

The RAM 102 temporarily stores at least a part of an OS (Operating System) program and an application program to be executed on the CPU 101. Furthermore, the RAM 102 stores various kinds of data necessary in processing performed by the CPU 101. The HDD 103 stores the OS program or the application program. The graphics processing unit 104 is connected to a monitor 108 and displays an image on the screen of the monitor 108 in accordance with a command from the CPU 101. The input interface 105 is connected to a keyboard 109a and a mouse 109b, and transmits a signal received from the keyboard 109a or the mouse 109b, to the CPU 101 via the bus 107. The communication interface 106 is connected to the intranet 10, and performs data exchange with other devices via the intranet 10.

Such a hardware configuration realizes the processing function according to the present embodiment. Here, FIG. 4 illustrates the hardware configuration of only a log analysis server. However, other devices may have a similar hardware configuration.

Figure 5:
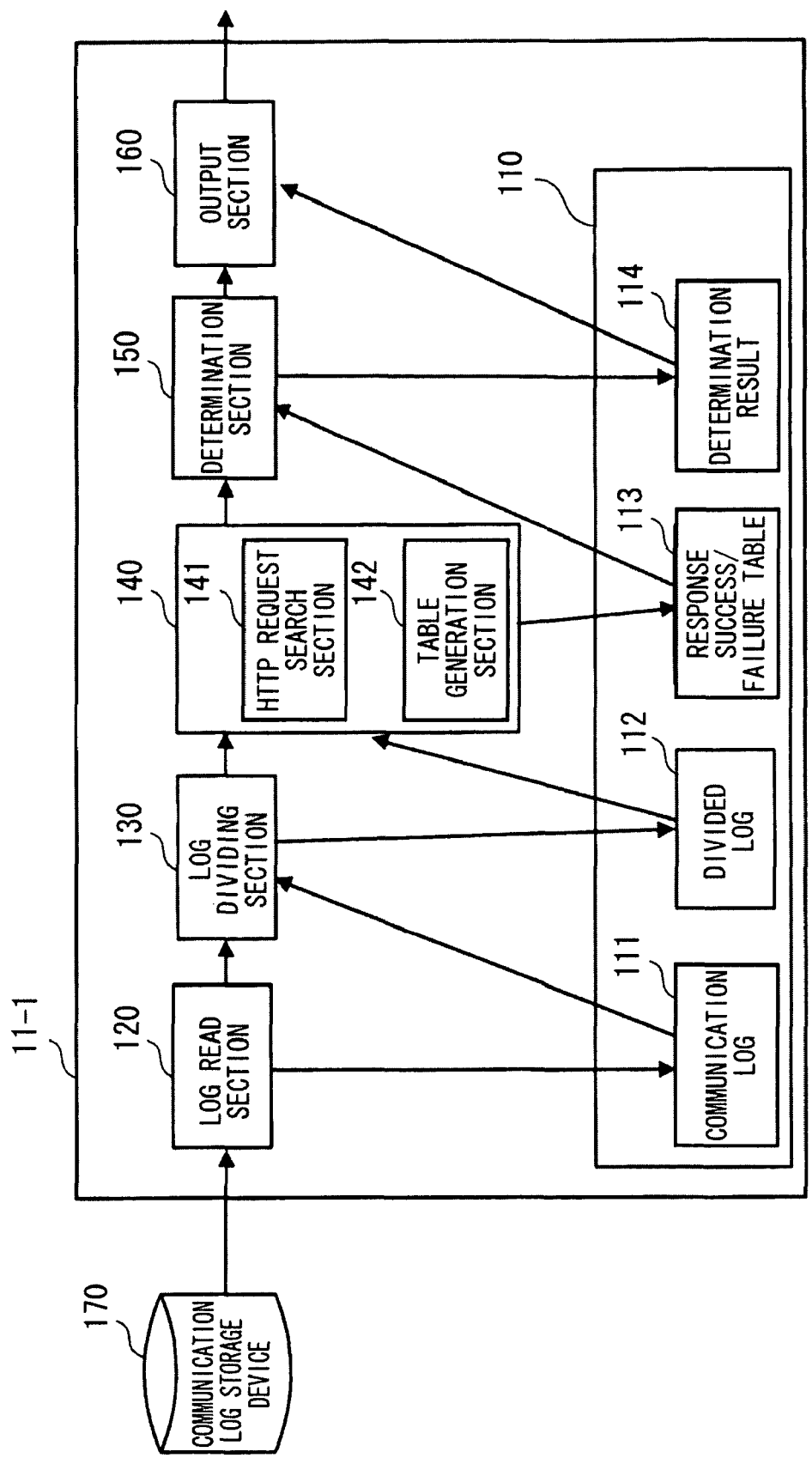
FIG. 5 is a block diagram illustrating an example of a software configuration of a P2P communication detection section.

Next, the software configuration is described for the P2P communication detection section serving as the principal part of the log analysis server 11. FIG. 5 is a block diagram illustrating an example of a software configuration of the P2P communication detection section.

The P2P communication detection section 11-1 has a storage section 110 for storing various kinds of information, a log read section 120, a log dividing section 130, a divided log analysis section 140, a determination section 150, and an output section 160. The P2P communication detection section 11-1 analyzes a communication log stored in a communication log storage device 170 so as to detect P2P communication.

The storage section 110 stores a communication log 111, a divided log 112, a response success/failure table 113, and a determination result 114. Details of such information are described later.

The log read section 120 reads a communication log belonging to a specific time period stored in the communication log storage device 170, and then stores the log as a communication log 111 in the storage section 110. The log dividing section 130 serves as the log dividing unit 1b, and divides the communication log 111 into parts corresponding to individual devices (referred to as "hosts", hereinafter). In this example, the communication log 111 is divided into parts corresponding to individual external hosts linked to the internet 30. The communication logs divided corresponding to individual external hosts are stored as divided logs 112 in the storage section 110. The divided log analysis section 140 serves as the divided log analyzing unit 1c, and has an HTTP request search section 141 and a table generation section 142. The HTTP request search section 141 analyzes the divided log 112 and searches for an HTTP request. When an HTTP request directed to an external host has been detected, the table generation section 142 generates a response success/failure table 113 corresponding to the external host. The response success/failure table 113 is stored in the storage section 110. The determination section 150 serves as the determining unit 1e, and determines whether P2P software is installed in the external host on the basis of the response success/failure table 113. The result of determination is stored as a determination result 114 in the storage section 110. On the basis of the determination result 114, the output section 160 provides the determination result to a user.

Next, operation of the individual processing units and data generated by the processing are described below in detail.

The communication log storage device 170 accumulates information concerning all IP packets acquired by the network monitoring device 13 that pass through a monitoring point (between the proxy server 14 and the firewall 12). Here, it is assumed that filtering is not performed and hence all packets can be acquired. Information recorded in the communication log need not contain the entire payload of a packet. The information types to be maintained in the communication log depend on the type of the network monitoring software. However, the sender IP address, the destination IP address, the detection date and time, the protocol, the packet type, and the like may be recorded. Further, the specific time period indicates a time period such as one day or one week. When the communication log storage device 170 can be accessed, the communication log may be read directly. Further, the communication log may be acquired from the network monitoring device 13 via the network. Alternatively, a communication log recorded in a recording medium may be read.

When the P2P communication detection processing is started, the log read section 120 reads from the communication log storage device 170 a communication log belonging to a specific time period, and then stores the log as a communication log 111 in the storage section 110.

FIG. 6 is a diagram illustrating an example of a communication log.

The communication log 1110 includes information columns such as an identification number (No.) column 1111, a time column 1112, a sender IP (address) column 1113, a destination IP (address) column 1114, a protocol column 1115, and an information column 1116. The identification number column 1111 includes a number for identifying each row of the communication log. The time column 1112 indicates the time when the packet was detected. The sender IP column 1113 indicates the IP address of the sender who transmits the detected packet. The destination IP column 1114 indicates the IP address of the destination that receives the detected packet. The protocol column 1115 indicates the protocol of the detected packet. The information column 1116 includes information relating to the packet, such as the sender port, the destination port, and the packet type. For example, the part left of the ">" mark indicates the port of the sender, while the part on the right indicates the port of the destination. Further, the character string inside the square brackets [ ] indicates the type of the packet. For example, the information of No. 1, which is "2520>http [SYN] . . . ", indicates that the sender port is "2520", the destination port is "http"; and a "SYN" packet has been sent.

The log dividing section 130 divides the communication log 1110 into parts corresponding to individual external hosts. Here, except for a part of control communication, the communication log acquired at the entrance and exit of the intranet 10 records communication between an internal host in the company (terminals 16*a*, 16*b*, 16*c*, 16*d*) and an external host (PCs 41*a*, 41*b*, 41*c*) linked to the internet 30. That is, as for the destination IP address and the sender IP address, any one of these may be an IP address used inside the intranet (e.g., in a company), while the other may be an external IP address. The range of IP addresses used in the intranet is known. Thus, which address corresponds to an external host may be easily recognized. Here, for simplicity, addresses 1.2.0.0 to 1.2.255.255 are assumed to be addresses inside the intranet. Then, the sender IP address and the destination IP address recorded in the communication log 111 are checked to see if the addresses fall within the range of the intranet addresses. When the addresses fall within the range, the addresses are determined to be the IP addresses of internal hosts. When an address is outside the range, the address is determined to be the IP address of an external host. For example, the sender IP of identification No. 1 in the communication log 1110 is "1.2.3.4". Thus, this IP address is determined to be an internal host in the intranet. Furthermore, the destination IP is "100.1.2.3". Thus, the IP address is determined to be an external host outside the intranet. Accordingly, the communication of identification No. 1 is recognized as a SYN packet sent from an internal host in the intranet to an external host outside the intranet. Here, FIG. 6 illustrates an example in which a popular network monitoring software "WireShark" is employed. However, the communication log may be generated by another network monitoring software.

The communication log is divided into parts corresponding to individual IP addresses of external hosts detected as described above.

Figure 7:
FIG. 7 is a diagram describing division processing for a communication log.

FIG. 7 is a diagram describing division processing for the communication log. In the figure, for simplicity, the identification numbers, the sender IPs, and the destination IPs are extracted.

The communication log 1110*a* is a communication log not yet divided. Here, similarly to the description given above, the range of IP addresses in the intranet is assumed to be from 1.2.0.0 to 1.2.255.255.

In identification No. 1 in the communication log 1110*a*, similarly to above-mentioned processing, the sender IP is the IP address of an internal host 1.2.3.4, while the destination IP is the IP address of an external host 100.1.2.3. The log dividing section 130 divides the communication log with respect to external hosts. Thus, with respect to the external host 100.1.2.3, all communication logs in which 100.1.2.3 is detected as the sender IP or the destination IP are extracted from the communication log 1110*a* so that a divided log 1120*a* is generated. In the example illustrated in the figure, identification Nos. 1, 3, 4, and 9 are extracted from the communication log 1110*a* so that a divided log 1120*a* corresponding to the external host 100.1.2.3 is generated. Similarly, identification Nos. 2, 5, 8, and 10 are extracted from the communication log 1110*a* so that a divided log 1120*b* corresponding to an external host 110.10.20.30 is generated. Similarly, identification Nos. 6 and 7 are extracted from the communication log 1110*a* so that a divided log 1120*c* corresponding to an external host 120.100.10.1 is generated. The generated divided logs 1120*a*, 1120*b*, and 1120*c* are stored in the storage section 110.

Here, in FIG. 7, the sender IPs and the destination IPs have been extracted for the purpose of describing dividing the communication log into parts corresponding to individual external hosts. However, actually, the log dividing section 130 transfers all information items in the communication log 1110 illustrated in FIG. 6. Here, all rows in the communication log 1110 are communication logs corresponding to the external host 100.1.2.3. Thus, in the following description, in the divided log corresponding to the external host 100.1.2.3, the contents of the communication log 1110 illustrated in FIG. 6 are all transferred.

Then, the divided log analysis section 140 analyzes the divided logs sequentially.

First, the HTTP request search section 141 determines whether an HTTP request is detected in the divided logs 1120*a*, 1120*b*, and 1120*c*. In an example of HTTP/1.1, possible HTTP requests include "HTTP GET", "HTTP HEAD", "HTTP POST", "HTTP PUT", "HTTP DELETE", "HTTP OPTIONS", "HTTP TRACE", "HTTP CONNECT", "HTTP PATCH", "HTTP LINK", and "HTTP UNLINK". The HTTP request search section 141 compares the corresponding row in the divided log with all character strings of HTTP requests, and searches for a request. In the example of the communication log 1110, "HTTP GET" in No. 4 is detected.

Then, for each searched row, whether or not the destination IP address is that of an external host is determined. When the destination IP address is that of an external host, it is determined as an "HTTP request directed to an external host". When the destination IP address is that of an internal host, it is determined as an "HTTP request directed to an internal host". When an HTTP request directed to an external host has been detected, the data is transferred to the table generation section 142. In the example illustrated in FIG. 6, the destination IP of "HTTP GET" in identification No. 4 is the IP address of an external host. Thus, identification No. 4 is determined to be an HTTP request directed to an external host. Then, a response success/failure table is generated by the table generation section 142.

The table generation section 142 generates a response success/failure table corresponding to the external host in which an HTTP request directed to an external host has been detected. As described above, when monitoring is performed on the outer side of the proxy server 14, the response is determined based on whether a SYN/ACK packet is returned in response to a SYN packet of a TCP handshake. First, a SYN packet is retrieved from the divided log. In the case of the communication log illustrated in FIG. 6, searching for a character string [SYN] is sufficient. When a SYN packet is found, the detection time, the sender IP, the destination IP, the sender port, and the destination port of the foundpacket are extracted and then registered in the response success/failure table 113. In the case of FIG. 6, identification No. 1 is detected, and hence the time "2007-12-21-18:57:02.307646", the sender IP "1.2.3.4", the destination IP "100.1.2.3", the sender port "2520", and the destination port "http" are registered in the response success/failure table 113.

Then, a SYN/ACK packet is found in the same divided log. The retrieval method is similar to that for the SYN packet. The detected packet is compared to the information of the registered SYN packet to determine whether or not the packet is a response to the registered SYN packet. When the packet is a response corresponding to the SYN packet, the following conditions are satisfied:

destination IP address of SYN/ACK packet=sender IP address of SYN packet sender IP address of SYN/ACK packet=destination IP address of SYN packet destination port of SYN/ACK packet=sender port of SYN packet sender port of SYN/ACK packet=destination port of SYN packet detection time of SYN/ACK packet is later than time of SYN packet (when a plurality of SYN packets satisfies this condition, the packets with the smallest time difference are considered).

When a SYN/ACK packet that satisfies these conditions is detected with respect to a SYN packet, the presence of a response of a TCP handshake is concluded. Thus, the entry for the SYN packet in the response success/failure table 113 is set as "success". Since one SYN packet corresponds to one SYN/ACK packet, when a SYN/ACK packet that satisfies the conditions is not detected, the absence of a response of a TCP handshake may be concluded. Thus, the entry for the SYN packet in the response success/failure table 113 is set as "failure". Thus, entries in the response success/failure table 113 are either "success" or "failure".

In the example of FIG. 6, with respect to the SYN packet of identification No. 1, the SYN/ACK packet of identification No. 2 satisfies the conditions. Thus, "success" is set in the response success/failure table 113 corresponding to the SYN packet of identification No. 1.

FIG. 8 is a diagram illustrating an example of a response success/failure table.

The response success/failure table 1130 includes an identification number column (No.) 1131, a time column 1132, a sender IP column (address) 1133, a destination IP column (address) 1134, a sender port column 1135, a destination port column 1136, and a success/failure column 1137.

The identification number column 1131, the time column 1132, the sender IP column 1133, and the destination IP column 1134 are the same as the information columns of the same names illustrated in FIG. 6. Thus, their description is omitted. The sender port column 1135 indicates the port of the sender of a particular packet. The destination port column 1136 indicates the port of the destination that will receive a particular packet. The information in the time column 1132, the sender IP column 1133, the destination IP column 1134, the sender port column 1135, and the destination port column 1136 in the request packet detected by the HTTP request search section 141 is saved. For example, the information concerning the SYN packet of identification No. 1 in the communication log 1110 of FIG. 6 detected by the HTTP request search section 141 is transcribed to identification No. 1 in the response success/failure table 1130.

Information indicating whether a response to the packet has been detected or not is registered by the table generation section 142 in the success/failure column 1137. "Success" is registered when a response is detected, while "failure" is registered when no response is detected. In the case of the SYN packet registered for identification No. 1 in the response success/failure table 1130, a response has been obtained. Thus, "success" is registered.

Further, the packet registered for identification No. 2 in the response success/failure table 1130 is the SYN packet for identification No. 21 in the communication log 1110 of FIG. 6. In this example, it is assumed that a SYN/ACK packet corresponding to the SYN packet at No. 21 is not detected. In this case, "failure" is registered in the success/failure column 1137. Here, " . . . " in the success/failure column 1137 indicates that the same value as the previous line is registered.

The above-mentioned procedure is performed on all requests (SYN packets, in this example) registered in the response success/failure table 1130. Then, all columns in the response success/failure table 1130 are registered.

Then, based on the generated response success/failure table 1130, the determination section 150 determines whether peer-to-peer communication has been performed. Here, the following description is given where the response success/failure table 1130 illustrated in FIG. 8 is determined by employing the criterion condition "when no response is obtained continuously for 5 hours or longer, peer-to-peer communication is performed". In FIG. 8, it is assumed that "success" is registered in the rows from identification No. 3 to identification No. 100, "failure" is registered in the rows from identification No. 103 to identification No. 311, and "success" is registered in the row identification No. 312 and thereafter.

The determination section 150 searches for rows in which the item of success/failure column 1137 is "failure". When the search is performed in the order of identification numbers, "failure" at identification No. 2 is detected. Nevertheless, the next identification No. 3 has "success". Then, the time difference does not satisfy the criterion condition "continuously for 5 hours or longer". Thus, based on the data at identification No. 2, the determination section 150 determines that no P2P communication is being performed. Then, "failure" at identification No. 101 is detected. Further, "failure" is detected successively to identification No. 311. The time difference from identification No. 101 to identification No. 311 is approximately 11 hours and 30 minutes, and hence satisfies the criterion condition "continuously for 5 hours or longer". Thus, based on this result, the determination section 150 determines that P2P communication has been performed. Then, the IP address of the external host determined as having performed P2P communication is registered as an "IP address where P2P communication is suspected" in the determination result 114. At that time, the IP address of the destination of the transmitted request and the like are set in the determination result. Further, information, like the time zone in which no response has been detected, which is obtained by statistical processing performed by the determination section 150, may be registered. The determination result 114 in which the result of determination is registered is stored in the storage section 110. result of determination is registered is stored in the storage section 110.

The output section 160 provides the determination result 114 to the user, for example, by displaying the data on a display device.

Figure 9:
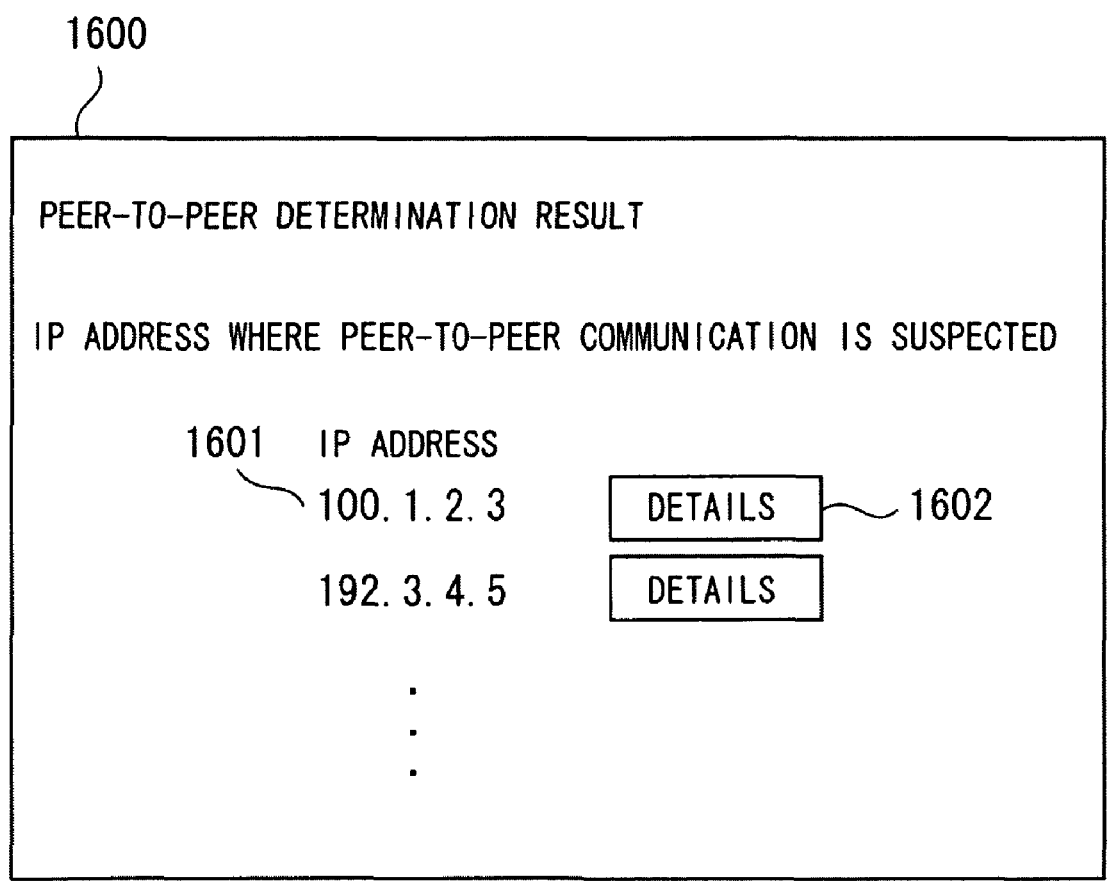
FIG. 9 is a diagram illustrating an example of a determination result display screen.

FIG. 9 is a diagram illustrating an example of a determination result display screen.

A determination result display screen 1600 is displayed on a monitor 108 of the log analysis server 11 or a monitor of a user terminal connected through the intranet 10. The "list of IP addresses where P2P communication is suspected" stored in the determination result 114 is read out, and then the list of IP addresses is displayed (1601). Further, when "details" 1602 of the corresponding row is clicked or otherwise operated, the IP address of the counterpart of P2P communication and statistical information such as the time zone in which no response has been detected are displayed. Further, information such as the communication log corresponding to the external host of this IP address may be displayed.

Here, in addition to displaying the determination result 114 on a display device, the output section 160 may output the information of IP addresses where P2P communication is suspected, in the form of a file to the outside.

Next, the processing procedure of a communication detection method executed by the log analysis server 11 according to the first embodiment is described below.

Figure 10:
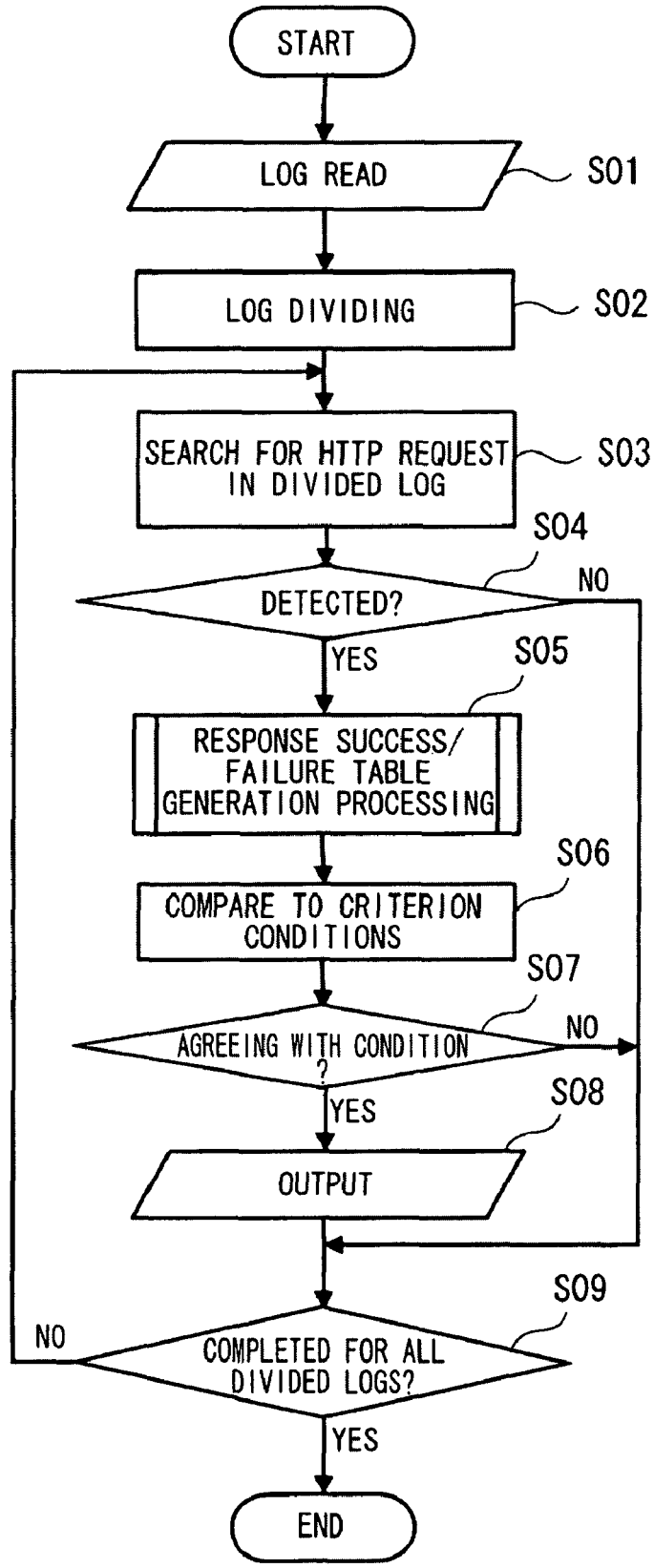
FIG. 10 is a flow chart illustrating a processing procedure of a communication detection method according to a first embodiment.

FIG. 10 is a flow chart illustrating a processing procedure of a communication detection method according to the first embodiment. When a processing start request is issued by a user, or alternatively at a timing determined in advance, the processing is started.

[Operation S01] A communication log belonging to a specific time period is read from the communication log storage device 170, and then stored as a communication log 111 in the storage section 110.

[Operation S02] The communication log stored in the communication log 111 is divided into parts corresponding to individual external hosts so that divided logs 112 are generated. The divided logs 112 divided corresponding to individual external hosts are stored in the storage section 110.

[Operation S03] Among the divided logs 112, a divided log corresponding to one external host is read, and then the presence of an HTTP request is checked. The object of the search is an HTTP request directed from an internal host to the external host.

[Operation S04] Whether an HTTP request to the external host corresponding to the divided log has been detected or not is determined at operation S03. When a request is detected, the procedure goes to operation S05. When no request is detected, the procedure goes to operation S09.

[Operation S05] When an HTTP request directed to the external host has been detected, a response success/failure table corresponding to this external host is generated. Details of response success/failure table generation processing are described later.

[Operation S06] The contents of the response success/failure table generated at operation S05 is compared to a criterion condition. For example, when the criterion condition is "whether a time zone is present in which no success appears for continuous 5 hours or longer", a time zone in which no success is detected is calculated on the basis of the response success/failure table. Then, the calculated time is compared to the criterion condition.

[Operation S07] Whether the contents of registration in the response success/failure table agree or not with the criterion condition is determined. In case of an agreement, the procedure goes to operation S08. In case of a disagreement, the procedure goes to operation S09.

[Operation S08] When the contents of the response success/failure table agree with the criterion condition, it is determined that the external host is suspected of performing P2P communication. Then, the IP address of the external host is outputted to the "list of IP addresses where P2P communication is suspected".

[Operation S09] Whether processing has been completed or not for all divided logs, that is for all detected external hosts, is determined. When the processing is not yet completed, the procedure returns to operation S03 so that the processing may be performed on the next divided log. When the processing has been completed for all divided logs, the procedure is terminated.

When the above-mentioned processing procedure is executed, external hosts having performed P2P communication are identified on the basis of features in communication behavior of P2P communication.

Figure 11:
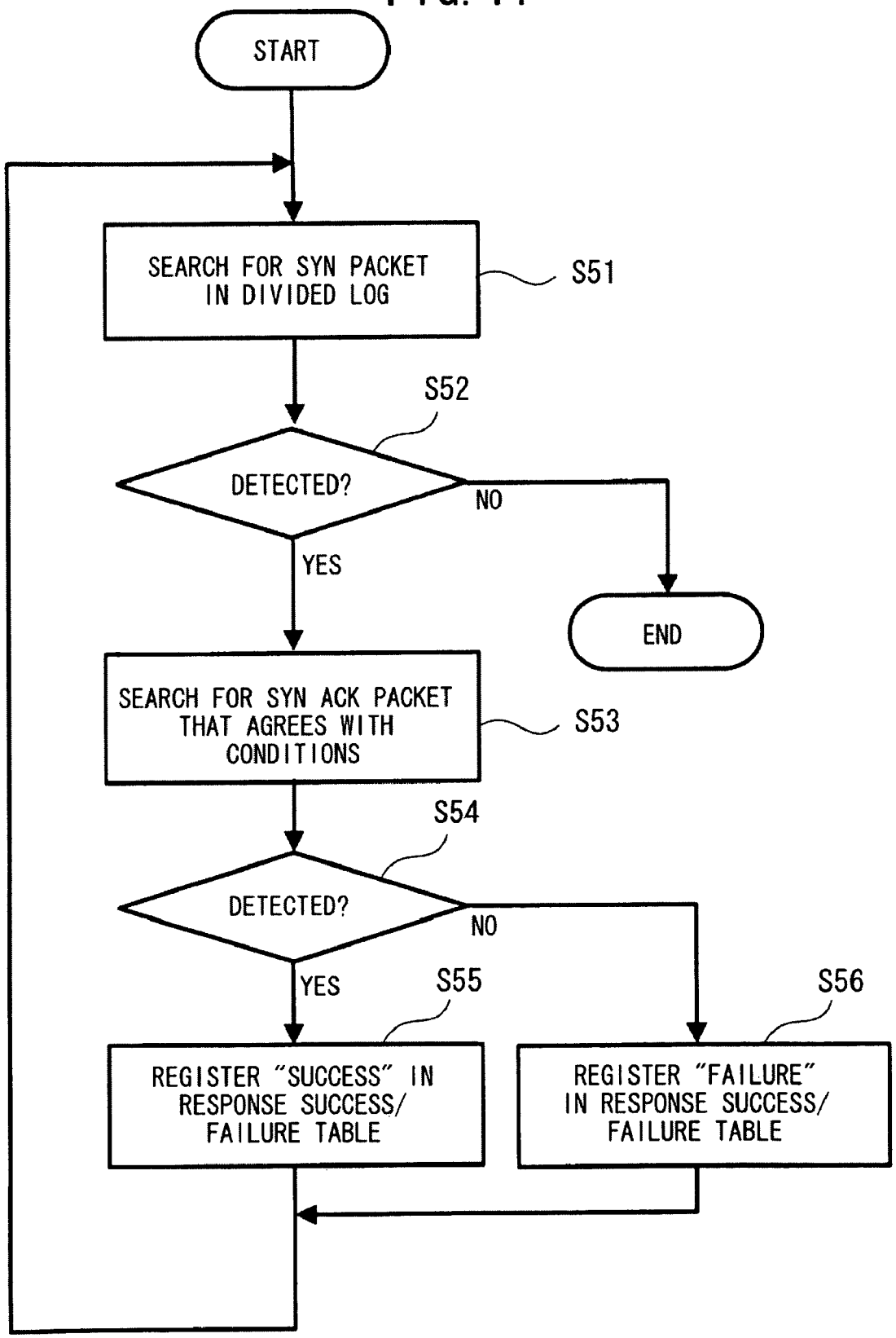
FIG. 11 is a flow chart illustrating a procedure of response success/failure table generation processing according to a first embodiment.

Next, the response success/failure table generation processing according to the first embodiment is described below. FIG. 11 is a flow chart illustrating a procedure of response success/failure table generation processing according to the first embodiment.

[Operation S51] The divided log is scanned for a SYN packet of a TCP handshake.

[Operation S52] Whether a SYN packet has been detected or not at operation S51 is determined. When a packet is detected, the procedure goes to operation S53. When no packet is detected, the procedure is terminated.

[Operation S53] When a SYN packet has been detected, a SYN/ACK packet is searched for that satisfies the conditions of correspondence to this SYN packet. These conditions are that a SYN/ACK packet has interchanged sender IP address and destination IP address as well as interchanged sender port and destination port in comparison to the SYN packet and that the SYN/ACK packet's detection time is later than the time of the SYN packet.

[Operation S54] Whether a SYN/ACK packet that satisfies the conditions has been detected or not is determined. When a packet is detected, the procedure goes to operation S55. When no packet is detected, the procedure goes to operation S56.

[Operation S55] When a SYN/ACK packet corresponding to the SYN packet is detected, the information items concerning this SYN packet are registered in the response success/failure table and "success" is registered in the field of success or failure. After the registration in the response success/failure table, the procedure returns to operation S51 so that searching is performed on the next SYN packet.

[Operation S56] When a SYN/ACK packet corresponding to the SYN packet is not detected, the information items concerning this SYN packet are registered in the response success/failure table and "failure" is registered in the field of success or failure. After the registration in the response success/failure table, the procedure returns to operation S51 so that searching is performed on the next SYN packet.

When the above-mentioned processing procedure is executed, response success or failure is determined in accordance with whether the TCP handshake has been performed or not, and then a response success/failure table is generated. In the description of the flow chart given above, a SYN/ACK packet is searched for at each time a SYN packet is detected. However, first, all SYN packets may be detected and registered in the response success/failure table. Then, all SYN/ACK packets may be extracted. Then, in accordance with whether each SYN/ACK packet corresponds to a registered SYN packet, response success or failure may be registered.

Next, a second embodiment is described below for a case where a network monitoring device for providing a communication log to a log analysis server is arranged on the inner side of a proxy server (on the side away from an external network).

Figure 12:
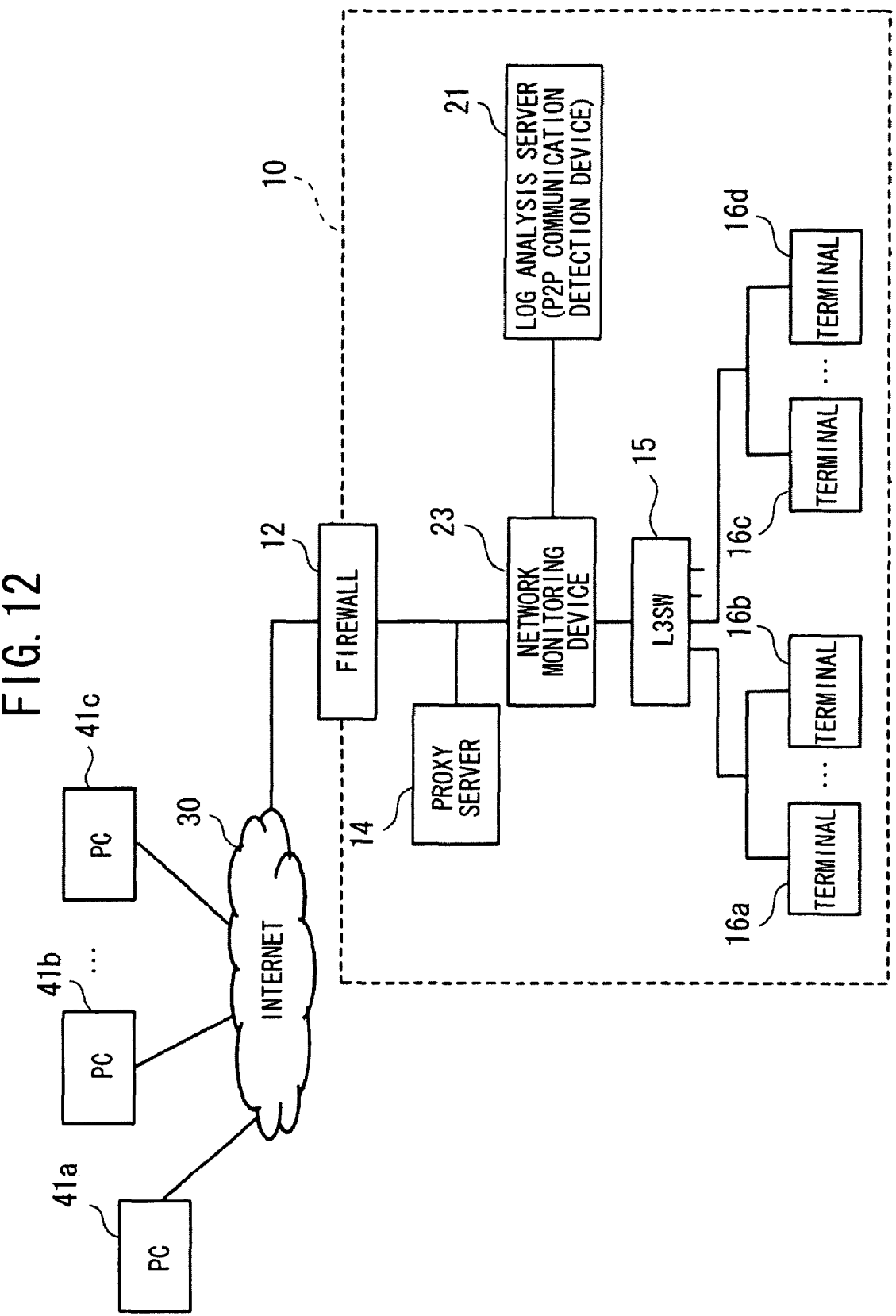
FIG. 12 is a diagram illustrating an example of a system configuration according to a second embodiment.

FIG. 12 is a diagram illustrating an example of a system configuration according to the second embodiment. Like parts to those in the configuration according to the first embodiment illustrated in FIG. 3 are designated by like numerals, and hence their description is omitted.

In the first embodiment, the network monitoring device 13 was located on the outer side of the proxy server 14 (on the side near the Internet 30). In contrast, in the second embodiment, the network monitoring device 23 is located on the inner side of the proxy server 14, that is, on the side away from the Internet 30, and hence is arranged between the proxy server 14 and the L3SW 15. The log analysis server 21 acquires a communication log from the network monitoring device 23 so as to perform the processing of detecting P2P communication.

Here, the components for realizing the processing functions provided in the log analysis server 21 according to the second embodiment are similar to the components according to the first embodiment illustrated in FIG. 5. Thus, the function obtained in the second embodiment is described below by using the numerals of the components illustrated in FIG. 5. Further, the log analysis server 21 may be realized by a computer having a hardware configuration similar to that illustrated in FIG. 4.

Here, communication behavior (detected communication data) where the network monitoring device 23 is arranged on the inner side of the proxy server 14 is described below.

Figure 13:
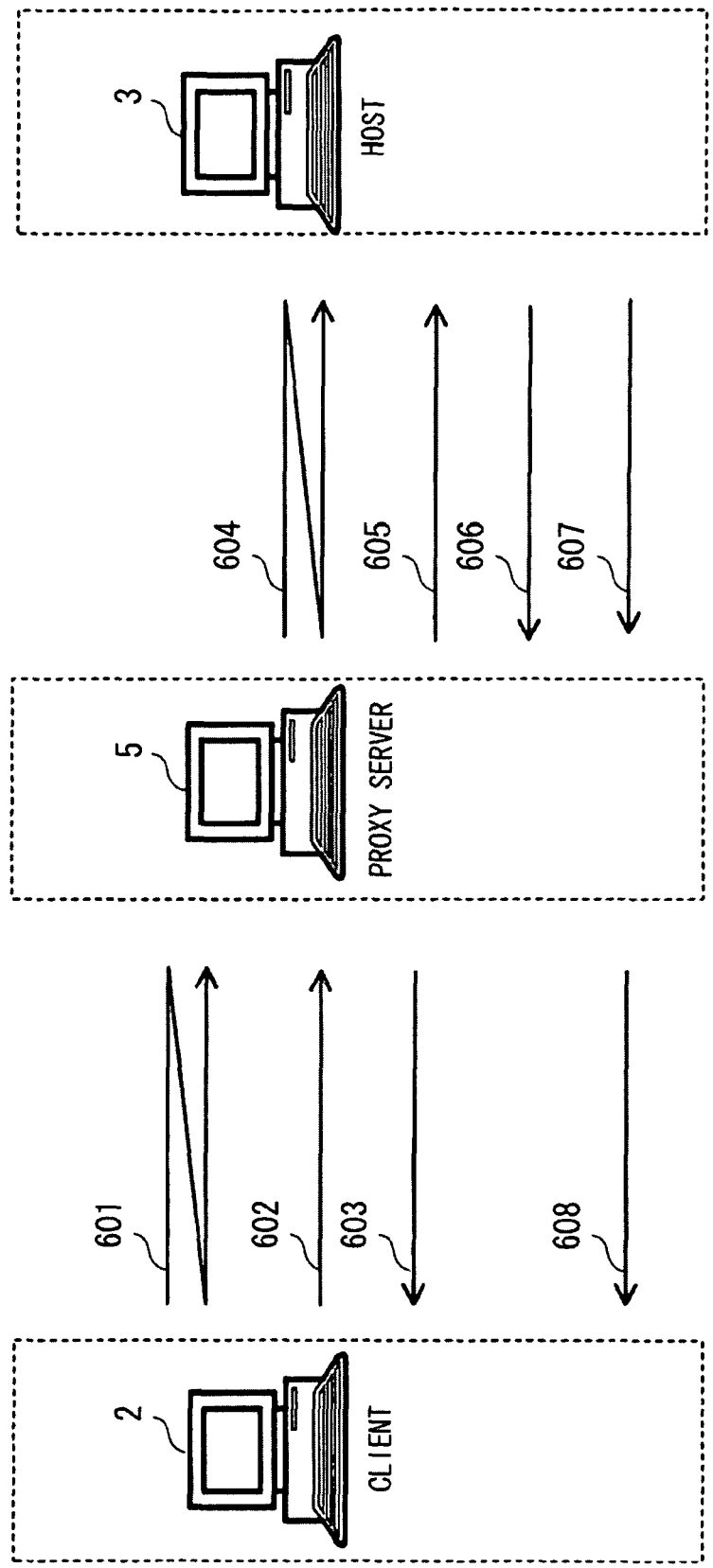
FIG. 13 is a diagram describing communication behavior of a host in a power-ON state according to a second embodiment.

FIG. 13 is a diagram describing communication behavior of a host in a power-ON state according to the second embodiment.

First, in order that connection from the client 2 to a proxy server 5 should be established, a TCP handshake (601) is started. In the TCP handshake (601), the processing procedure of the three-way handshake described in FIG. 2 is performed. The proxy server 5 is assumed as being always in a power-ON state. Thus, the TCP handshake (601) may be assumed to be completed normally. After the TCP handshake (601), the client 2 transmits, to the proxy server 5, a packet (602) corresponding to an "HTTP CONNECT req (request)" for requesting connection with a host. When receiving this request, the proxy server 5 sends back a TCP ACK packet (603) to the client 2. Further, TCP handshake (604) is performed with the host 3 of request destination, so that connection is established. Then, a packet (605) corresponding to an HTTP GET request is transmitted to the host 3, so that a TCP ACK packet (606) and a packet (607) corresponding to "HTTP res (response) 200 OK" are obtained. Here, the response of "200 OK" is set forth in RFC2616 or the like, and indicates a "normal response".

The proxy server 5 transmits, to the client 2, a packet (608) corresponding to the response "HTTP res 200 OK" from the host 3.

Figure 14:
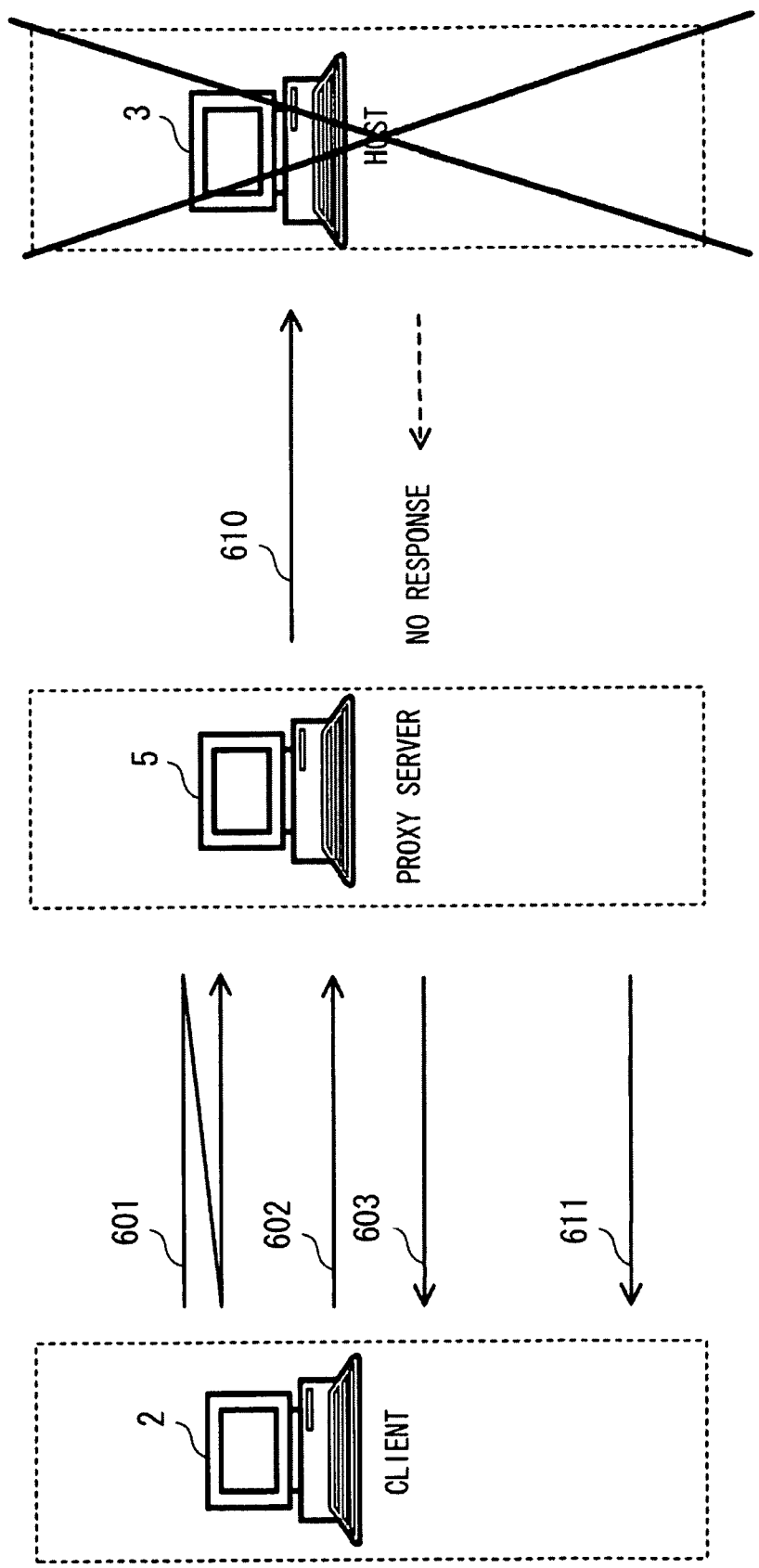
FIG. 14 is a diagram describing communication behavior of a host in a power-OFF state according to a second embodiment.

FIG. 14 is a diagram describing communication behavior of a host in a power-OFF state according to the second embodiment. Like parts to those illustrated in FIG. 13 are designated by like numerals.

Similarly to FIG. 13, first, in order that connection from the client 2 to a proxy server 5 should be established, a TCP handshake (601) is started. The proxy server 5 is assumed as being always in a power-ON state. Thus, the TCP handshake (601) is assumed to be completed normally. After the TCP handshake (601), the client 2 transmits, to the proxy server 5, a packet (602) corresponding to an "HTTP CONNECT req (request)" for requesting connection with a host. When receiving this request, the proxy server 5 sends back a TCP ACK packet (603) to the client 2. Further, for the purpose of TCP handshake with the host 3 of request destination, a TCP SYN packet (610) is transmitted to the host 3. Nevertheless, since the host 3 is in a power-OFF state, no response is returned. Thus, the proxy server 5 transmits to the client 2 a packet (611) corresponding to "HTTP res 504 Gateway Timeout". Here, "504 Gateway Timeout" is set forth in RFC2616 or the like, and indicates that "no response has been returned and a timeout has occurred". In the following description, for simplicity, a packet corresponding to an HTTP request is referred to as an HTTP request, while a packet corresponding to an HTTP response is referred to as an HTTP response.

As described above, in contrast to the first embodiment in which response success or failure is detected on the basis of the presence or absence of an SYN/ACK packet, in the second embodiment, detection is performed on the basis of whether the status code of an HTTP response (res) is "Gateway Timeout" or other response. That is, in the function processing illustrated in FIG. 5, the processing of the table generation section 142 is different.

The table generation section 142 according to the second embodiment searches a divided log so as to detect an HTTP CONNECT request. In the case of the communication log illustrated in FIG. 6, searching for the [HTTP CONNECT] is sufficient. From the found-out packet, the time, the sender IP address, and the destination IP address are extracted and then registered in the corresponding columns in the response success/failure table 113. If the sender port and the destination port are recorded in the communication log, these are also registered.

Then, the same divided log is searched for an HTTP response. In the case of the communication log illustrated in FIG. 6, searching for [HTTP HTTP] is sufficient. Then, an HTTP response corresponding to the response to each HTTP request in the response success/failure table is searched for among the found HTTP responses. A response corresponding to an HTTP request satisfies the following conditions.

destination IP address of HTTP response=sender IP address of HTTP CONNECT request sender IP address of HTTP response=destination IP address of HTTP CONNECT request detection time of HTTP response is later than time of HTTP CONNECT request (when a plurality of HTTP CONNECT requests satisfy this condition, the request with the smallest time difference is considered)

In general, one HTTP response that satisfies these conditions is found for each HTTP CONNECT request. Here, when no HTTP response is found for an HTTP CONNECT request, an occurrence of an abnormality in the proxy server 14 or the like is inferred. In such a case, (a) the processing may be continued while neglecting such a request, or alternatively (b) the detection processing itself may be nullified.

Finally, the response success/failure table is filled in accordance with the type of status code of the HTTP response. Here, the status code of an HTTP response is extracted from the part immediately after "HTTP HTTP/1.1" ("1.1" is a version number of HTTP; thus, the number may be 1.0, 0.9, or the like). The status code consists of three numeric characters and the status code name (in English). Typical examples include "200 OK" indicating a normal response, and "404 Not Found" indicating that the destination is not detected. For each HTTP CONNECT request, the table generation section 142 according to the second embodiment registers "success" in the corresponding entry when the corresponding HTTP response is a response other than "504 Gateway timeout", and registers "failure" when the response is "504 Gateway timeout". As such, all entries in the response success/failure table 113 include either "success" or "failure".

Next, the processing procedure of a communication detection method executed by the log analysis server 21 according to the second embodiment is described below.

The overall processing procedure is the same as the processing procedure according to the first embodiment illustrated in FIG. 10. However, the response success/failure table generation processing (operation S5) is different. The following description is given for the processing procedure of response success/failure table generation processing performed by the log analysis server 21.

Figure 15:
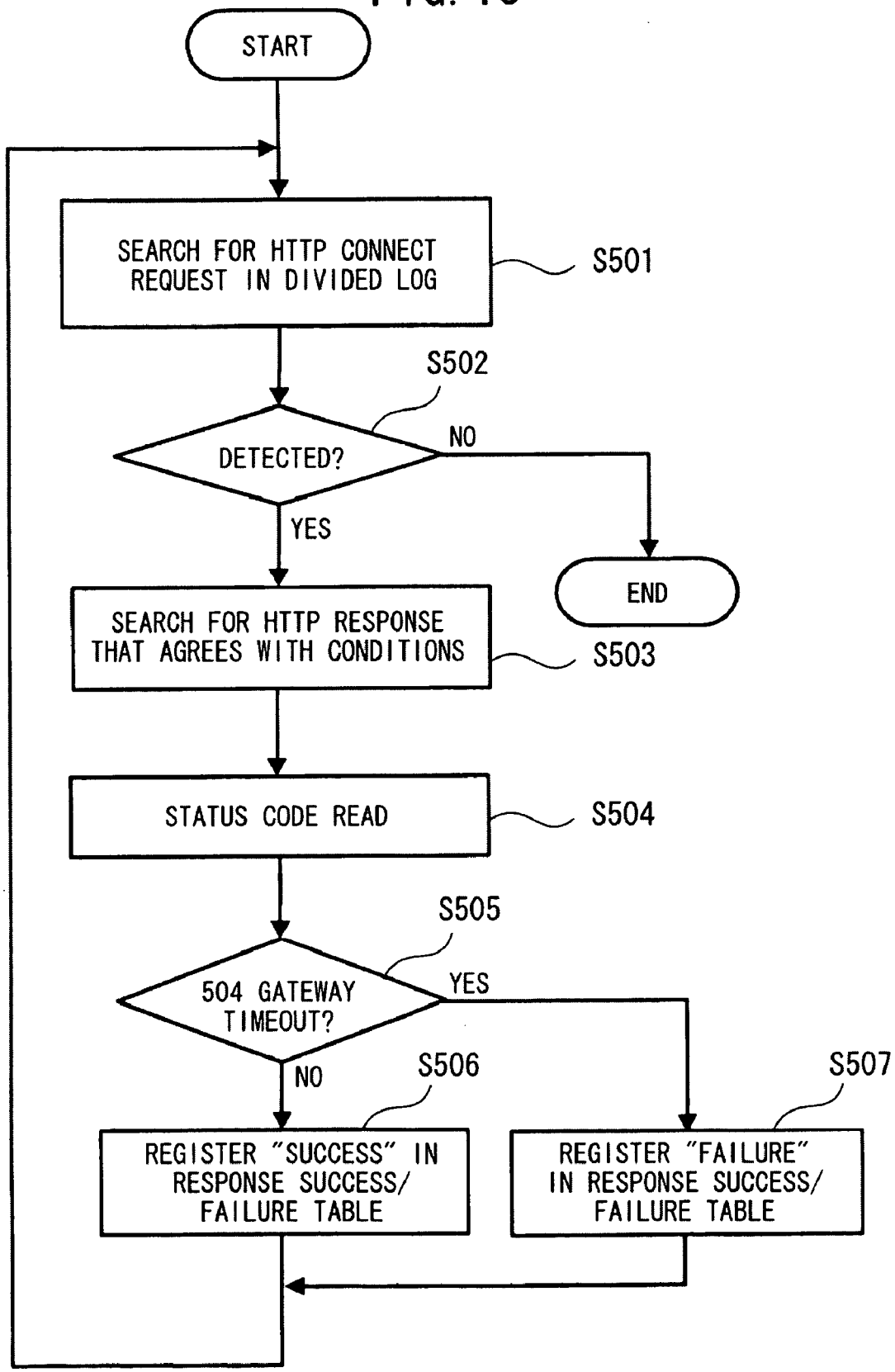
FIG. 15 is a flow chart illustrating a procedure of response success/failure table generation processing according to a second embodiment.

FIG. 15 is a flow chart illustrating a procedure of response success/failure table generation processing according to the second embodiment.

[Operation S501] The divided log is scanned for an HTTP CONNECT request.

[Operation S502] Whether an HTTP CONNECT request has been detected or not at operation S501 is determined. When a request is detected, the procedure goes to operation S503. When no request is detected, the procedure is terminated.

[Operation S503] When an HTTP CONNECT request has been detected, an HTTP response is searched for that satisfies the conditions of correspondence to the HTTP CONNECT request. The conditions are that an HTTP response has an interchanged sender IP address and destination IP address as well as an interchanged sender port and destination port in comparison to the HTTP CONNECT request, and that the detection time is later than the time of the HTTP CONNECT request.

[Operation S504] The status code is read from the detected HTTP response.

[Operation S505] The status code of the HTTP response read at operation S504 to see whether the status code is "504 Gateway timeout" or not. When the code is not "504 Gateway timeout", the procedure goes to operation S506. When the code is "504 Gateway timeout", the procedure goes to operation S507.

[Operation S506] When the status code of the HTTP response is not "504 Gateway timeout", the information items concerning the HTTP CONNECT request are registered in the response success/failure table and "success" is registered in the field of success or failure. After the registration in the response success/failure table, the procedure returns to operation S501 so that searching is performed on the next HTTP CONNECT request.

[Operation S507] When the status code of the HTTP response is "504 Gateway timeout", the information items concerning this HTTP CONNECT request are registered in the response success/failure table and then "failure" is registered in the field of success or failure. After the registration in the response success/failure table, the procedure returns to operation S501 so that searching is performed on the next HTTP CONNECT request.

When the above-mentioned processing procedure is executed, response success or failure is determined on the basis of the status code of an HTTP response corresponding to an HTTP CONNECT request, and then a response success/failure table is generated.

Here, in the description of the above flow chart, HTTP response detection was performed at each time of detection of an HTTP CONNECT request. However, the procedure described for the table generation section 142 according to the second embodiment may be adopted. That is, first, all HTTP CONNECT requests may be detected and registered in the response success/failure table. Then, all HTTP responses may be extracted. After that, correspondence to the registered HTTP CONNECT requests may be established. Then, response success or failure may be registered in accordance with the status codes.

As described above, even when the network monitoring device 23 is arranged on the inner side relative to the proxy server 14, the time period in which an external host does not return a response can be identified on the basis of the status code of a response obtained from the proxy server 14.

In the above-mentioned embodiments, a detection method for P2P communication has been described for a case where HTTP communication is employed. However, the present invention is not limited to this, and is applicable also to other Internet protocols such as SMTP (Simple Mail Transfer Protocol) and FTP (File Transfer Protocol). That is, the time period in which a host has been in a power-OFF state is identified on the basis of communication behavior when the host is in a power-ON state and the communication behavior when the host is in a power-OFF state. Thus, whether the host is a server that is almost always in a power-ON state or whether the host is a private personal computer and the like may be identified. Then, P2P communication may be detected.

The above-mentioned processing function can be realized by a computer. In this case, a program may be provided that describes the contents of processing of the function to be implemented in the communication detection device. When the program is executed by a computer, the above-mentioned processing function is realized on the computer. The program that describes the contents of processing may be recorded in a computer-readable recording medium.

The program may be sold for circulation in the form of a portable recording medium such as a DVD (Digital Versatile Disc) and/or a CD-ROM (Compact Disc Read Only Memory) in which the program is recorded. Further, the program may be stored in a storage device of a server computer. Then, the program may be transferred from the server computer to another computer via a network.

For example, a computer to execute the program may store, in its own storage device, the program recorded in the portable recording medium or alternatively the program transferred from the server computer. Then, the computer may read the program from its own storage device, and then execute processing in accordance with the program. The computer may read the program directly from the portable recording medium, and then may execute processing in accordance with the program. Further, at each time a program is transferred from the server computer, the computer may serially execute processing according to the received program.

What is claimed is:

1. A communication detection device comprising:
a log dividing unit to read a communication log from a communication log storage unit that stores the communication log that records information concerning communication data exchanged between devices linked to a network, and divide the communication log into parts corresponding to individual object devices based on a sender and a destination of the communication data recorded in the communication log;
a divided log analysis unit to analyze the parts of the divided communication log extract the communication data in which a connection request to each device has been issued, generate a response success/failure table in accordance with whether a response from the device that is an object of the connection request has been detected, and store the response success/failure table in a response success/failure table storage unit; and
a determination unit to determine, based on the response success/failure table stored in the response success/failure table storage unit, when a time period wherein no response is obtained from the device satisfies a criterion condition determined in advance, that peer-to-peer communication has been performed.

2. The communication detection device according to claim 1, wherein
based on the difference between the communication log acquired in accordance with communication behavior of a host that receives a connection request in a power-ON state and the communication log acquired in accordance with communication information behavior of the host that receives a connection request in a power-OFF state, the determination unit identifies whether the host is a server almost always in operation or a private computer usually powered OFF when not used, and determines whether the peer-to-peer communication has been performed.

3. The communication detection device according to claim 2, wherein
the communication log is acquired by a network monitoring device arranged at a point that permits direct monitoring of the communication data exchanged with the internal network through a firewall installed at a boundary between the external network and the internal network, and wherein
the divided log analysis unit searches the divided communication log for the connection request in which the communication address of the destination is that of the object device, registers success in the response success/failure table when a response corresponding to the retrieved connection request is detected in the communication log, and, when such a response is not detected in the communication log, registers failure in the response success/failure table.

4. The communication detection device according to claim 3, wherein
when a TCP connection request packet based on a TCP protocol has been retrieved from the communication log and detected, the divided log analysis unit searches for a TCP connection acknowledge response corresponding to the TCP connection request packet, and then performs registration of the success or failure of the TCP connection in the response success/failure table based on the presence or absence of the TCP connection acknowledge response.

5. The communication detection device according to claim 2, wherein
the communication log is acquired by a network monitoring device that is connected to a firewall installed at a boundary between an external network and an internal network via a relay server for relaying the communication data and that acquires a response from a device linked to the external network as status information from the relay server, and wherein
the divided log analysis unit searches the divided communication log for a connection request in which the communication address of the destination is the communication address of the object device, acquires, from the relay server, status information corresponding to the retrieved connection request, and registers success or failure in the response success/failure table in accordance with the status information.

6. The communication detection device according to claim 5, wherein
the divided log analysis unit searches the communication log for an HTTP response corresponding to an HTTP request based on an HTTP protocol, and performs registration of the success or failure of the HTTP response in the response success/failure table based on a status code of the HTTP response.

7. The communication detection device according to claim 1, wherein
the log dividing unit adopts, as the object device, an external device linked to an external network and having an unknown communication address, compares a communication address of an internal device linked to an internal network or a partly known communication address with a communication address of the sender and a communication address of the destination recorded in the communication log, and divides the communication log into parts each corresponding to the communication address of each external device in which the communication address of the sender or the communication address of the destination does not agree with the communication address of the internal device.

8. The communication detection device according to claim 1, wherein
the log dividing unit adopts, as the object device, an internal device linked to an internal network and having a known communication address or a partly known communication address, compares the communication address of the internal device with a communication address of the sender and a communication address of the destination recorded in the communication log, and divides the communication log into parts each corresponding to the communication address of each internal device that agrees with the communication address of the sender or the communication address of the destination.

9. A communication detection method comprising:
reading, by a processor, a communication log that records information concerning communication data exchanged between devices linked to a network, and dividing the communication log into parts corresponding to individual object devices based on a sender of the communication data and a destination recorded in the communication log;
analyzing the parts of the divided communication log, extracting the communication data in which a connection request to each device has been issued, and generating a response success/failure table based on whether a response from the device that is an object of the connection request has been detected; and determining, based on the response success/failure table, when a time period in which no response is obtained from the device satisfies a criterion condition determined in advance, that peer-to-peer communication has been performed.

10. A computer-readable recording medium that records a program for causing a computer to execute a communication detection method, the method comprising:

reading a communication log that records information concerning communication data exchanged between devices linked to a network, and dividing the communication log into parts corresponding to individual object devices based on a sender of the communication data and a destination recorded in the communication log;

analyzing the parts of the divided communication log, extracting the communication data in which a connection request to each device has been issued, and generating a response success/failure table based on whether a response from the device that is the object of the connection request has been detected; and determining, based on the response success/failure table, when a time period in which no response is obtained from the device satisfies a criterion condition determined in advance, that peer-to-peer communication has been performed.

* * * * *